United States Patent
Sepp

Patent Number: 5,837,918
Date of Patent: Nov. 17, 1998

[54] WEAPONS SYSTEM FOR A LASER

[75] Inventor: Gunther Sepp, Ottobrunn, Germany

[73] Assignee: Daimler-Benz Aerospace AG, Ottobrunn, Germany

[21] Appl. No.: 696,863

[22] PCT Filed: Nov. 22, 1995

[86] PCT No.: PCT/EP95/04588

§ 371 Date: Oct. 29, 1996

§ 102(e) Date: Oct. 29, 1996

[87] PCT Pub. No.: WO96/18912

PCT Pub. Date: Jun. 20, 1996

[30] Foreign Application Priority Data

Dec. 15, 1994 [DE] Germany .......................... 44 44 636.5

[51] Int. Cl.⁶ .............................. B64D 1/04; F41C 27/00
[52] U.S. Cl. .............................................. 89/1.11; 42/106
[58] Field of Search ................... 89/1.11, 41.05, 89/41.06, 1.1; 42/103, 106

[56] References Cited

U.S. PATENT DOCUMENTS

| | | | |
|---|---|---|---|
| 3,641,261 | 2/1972 | Chaplin et al. | 89/41.05 |
| 3,732,412 | 5/1973 | Tyroler | 89/1.11 |
| 3,946,233 | 3/1976 | Erben et al. | 89/1.11 |
| 4,486,807 | 12/1984 | Yanez | 361/232 |
| 4,489,415 | 12/1984 | Jones, Jr. | 372/38 |
| 4,893,815 | 1/1990 | Rowan | 89/1.11 |
| 5,355,609 | 10/1994 | Schenke | 42/103 |
| 5,390,204 | 2/1995 | Yessik et al. | 372/38 |
| 5,408,541 | 4/1995 | Sewell | 38/48 |
| 5,456,157 | 10/1995 | Lougheed et al. | 89/134 |
| 5,600,434 | 2/1997 | Warm et al. | 89/1.11 |

OTHER PUBLICATIONS

"Non–Lethal Alternatives Weighed by Law Officers", National Defense, May/Jun. 1994, pp. 28–30.
"Blinding Weapons : Gas 1918 . . . lasers 199?", International Committee of the Red Cross, May 1995.

*Primary Examiner*—Michael J. Carone
*Assistant Examiner*—Theresa M. Wesson
*Attorney, Agent, or Firm*—McGlew and Tuttle

[57] ABSTRACT

A weapons system/device is provided for a dazzling laser with directed laser radiation with a laser operating in the visible range. This is integrated in a rifle-like carrier with an aiming device, range finder, and a portable power supply unit. The laser is adjustable in terms of beam divergence, energy to be emitted, and irradiation time. A control computer is provided for entering target reconnaissance parameters, as well as measuring instruments for determining these parameters with respect to a target subject and the environment. The controls/instrumentation are associated with the laser, wherein the control computer calculates the laser parameters (beam divergence, single pulse or pulse train, pulse energy and pulse count of the pulsed laser) necessary for the reversible dazzling of the eye on the basis of the target reconnaissance parameters entered, and it automatically presets and regulates the resulting laser power and the exposure time of the continuous laser.

19 Claims, 1 Drawing Sheet

WEAPONS SYSTEM FOR A LASER

FIELD OF THE INVENTION

The present invention pertains to a weapons system for a dazzling laser with directed laser radiation of a suitable wavelength, intensity and duration with a laser operating in the visible range, which is integrated in a rifle-like carrier with an aiming device, range finder, and a portable power supply.

BACKGROUND OF THE INVENTION

A monomode laser for the treatment of the eyes, in which a diaphragm provided with two separate openings is arranged in the resonator such that the openings are located in front of one of the front surfaces of the laser bar, has become known from the document DE 36 03 334 A1. The monomode pulses emitted by this laser have a divergence of less than 2 mrad and an energy of 15 mJ, as well as a pulse length of about 10 nanosec. This device is to be used in ophthalmology. However, a use as a dazzling laser is not possible.

The military laser systems introduced to date, e.g., laser range finders, target markers and missile guide beam projectors, are unsuitable for use as eye-dazzling lasers, because their laser energy is designed, set permanently, for their respective military task, and they cannot be adapted to the requirements and application situations of an eye-dazzling laser. As a consequence, their use does not usually lead to a sufficiently intense, but still reversible dazzling of the eyes, but either to permanent damage to the eyes or to an insufficient effect on vision.

SUMMARY AND OBJECTS OF THE INVENTION

The primary object of the present invention is to provide a weapons system/device for a dazzling laser with directed laser radiation of a suitable wavelength, intensity and duration with a laser operating in the visible range, which is integrated in a rifle-like carrier with an aiming device, range finder, and a portable power supply, with which loss of vision for at least several seconds to minutes is reliably achieved in the irradiated subject without permanent damage to the retina occurring. The device shall not be able to be neutralized by simple countermeasures.

According to the invention, a weapons system/device is provided for a dazzling laser with directed laser radiation with a laser operating in the visible range. This is integrated in a rifle-like carrier with an aiming device, range finder, and a portable power supply unit. The laser is adjustable in terms of beam divergence, energy to be emitted, and irradiation time. A control computer is provided for entering target reconnaissance parameters, as well as measuring instruments for determining these parameters with respect to a target subject and the environment. The controls/instrumentation are associated with the laser, wherein the control computer calculates the laser parameters (beam divergence, single pulse or pulse train, pulse energy and pulse count of the pulsed laser) necessary for the reversible dazzling of the eye on the basis of the target reconnaissance parameters entered, and it automatically presets and regulates the resulting laser power and the exposure time of the continuous laser.

A flashlamp-pumped Nd:YAG solid-state pulsed laser is preferably provided, operating in the visible range, which has a wavelength of 0.53 $\mu$m, a pulse length of 10 nanosec, a pulse energy of <~50 mJ in the single pulse or <~0.5 mJ in the pulse train at 1 kHz and a laser beam diameter of about 20 cm at the target distance, as the laser.

A continuously emitting diode laser array may be used as the laser.

The laser can preferably be tuned to at least one other wavelength different from the usual laser wavelengths. At least one other laser wavelength can preferably be generated by selecting the laser material, by downstream Raman cells or OPOs (optical parametric oscillators) and/or other prior-art means.

The target reconnaissance parameters entered into the control computer with respect to the target subject are preferably his (the targets) distance and optionally the light-transmitting capacity of a telescope or sunglasses used by the target subject, and the target reconnaissance parameters entered into the control computer concerning the environment are the brightness of the target's environment, the meteorological visibility and the turbulence of the atmosphere, and optionally the type and the extent of a disturbance in the line of sight due to obstacles.

Range finders and exposure meters are preferably used as measuring instruments. The visibility is preferably determined by contrast measurements by means of the aiming device and the range finder as a function of the distance from the gun operator. The target reconnaissance parameters are preferably estimated by the gun operator by observation by the naked eye and through the aiming device and they are entered into the control computer, and the target reconnaissance parameters determined with measuring instruments are automatically entered into the control computer, and the target reconnaissance parameters estimated by the gun operator are entered into the computer by the gun operator. The desired laser beam diameter at the target distance is preferably entered into the control computer by the gun operator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
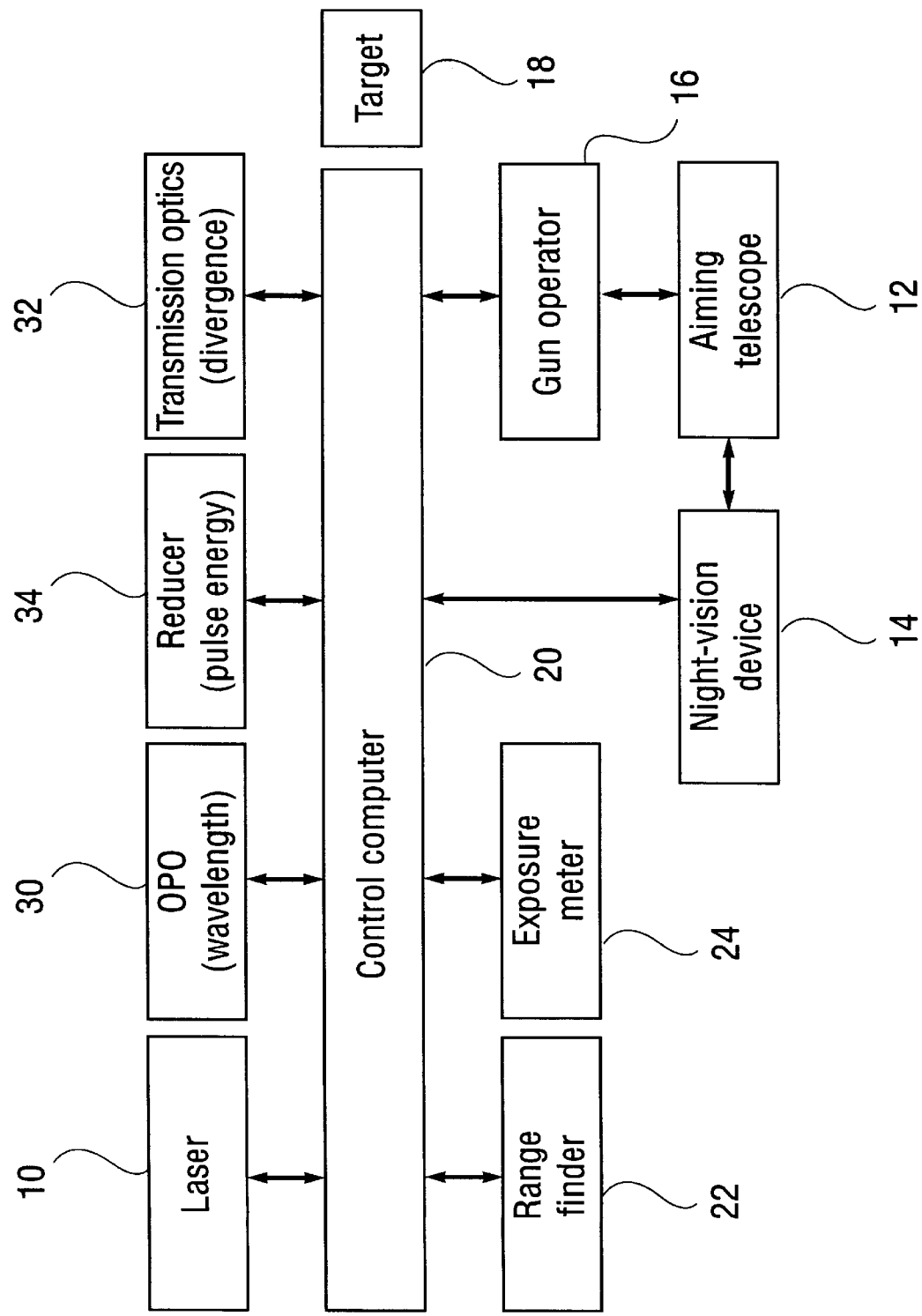
FIG. 1 is a system diagram of the control and instrumentation of the system of the invention.

To produce loss of vision, the human eye in question is irradiated with a directed laser radiation of a suitable wavelength, intensity and duration. If visible, monochromatic laser light is used, it is focused through the crystalline lens onto an extremely small spot on the retina, which is limited by diffraction effects only. The intensity of irradiation is increased as a result by a factor of about 5. This may lead to a loss of visual pigment, a changeover in the nervous excitability of the retina and consequently to an impairment in adaptability, to fatigue phenomena, dazzling pains, eyelid reactions, and hence to an impairment or complete loss of the visual functions, such as contrast sensitivity, visual acuity, etc.

With increasing intraocular exposure, irreversible photochemical and thermal changes occur on the cone- and rod-shaped visual cells, which may lead to permanent impairment of the visual power. Finally, high irradiated laser energy causes damage to the blood vessels of the retina, which leads to hemorrhages in the eye and to complete, irreversible loss of vision.

A pulsed laser emitting in the visible range at a wavelength $\lambda$ of between about 0.5 and 0.6 $\mu$m and with a pulse length of $\approx$10 nanosec is proposed as a laser that is best suited for this purpose. A visible wavelength is selected because reliable dazzling of the eyes is otherwise not guaranteed even at high, eye-damaging laser energies. It is also recommended that the wavelength be made variable or adjustable within a sufficiently broad range, instead of selecting a fixed value for it, because laser protection goggles designed for the usual laser wavelengths would otherwise be able to prevent dazzling as a countermeasure. The use of an individual, very short laser pulse to dazzle the eye makes simple countermeasures, such as the closing of mechanical blinds or the corneal reflex, ineffective. This is usually true even if the dazzling of the eyes is generated by a train of a plurality of pulses of a pulsed laser with a sufficiently high pulse frequency or by a continuously emitting laser, e.g., a diode laser array, if the duration of the exposure remains below about 0.1 sec.

The range of laser energies between the reversible "flashbulb dazzling" desired in the case of the eye-dazzling laser and irreversible damage to the eye is relatively narrow for the day-adapted eye. Approximately the following threshold values apply to the pulsed laser proposed for intraocular exposure:

| | |
|---|---|
| Laser safety standard | max. 0.2 $\mu$J |
| Dazzling | <$\approx$3 $\mu$J |
| Minimal lesion | 3 $\mu$J |
| Hemorrhage (bleeding in the eye) | 80–150 $\mu$J |

The energy threshold for dazzling is markedly lower for the night-adapted eye, so that the distance between dazzling and damage is considerably greater.

The desired reversible elimination of the ability to see is reliably guaranteed if the "correct" laser energy is irradiated into the eyes. However, considerable care must be taken not to reach or even exceed the threshold for an irreversible damage to the eyes.

A flashlamp-pumped Nd:YAG solid-state laser designed as a frequency-doubling laser is proposed as an exemplary embodiment for such a dazzling laser 10. Its wavelength is 0.53 $\mu$m, i.e., in the green range of the spectrum, and its pulse length is 10 nanosec. The pulse energy is <~50 mJ for the single pulse and <~0.5 mJ for a pulse train at 1 kHz.

While this wavelength is intended for dazzling the unprotected eye, the neutralization of laser protection goggles as a countermeasure requires at least one more wavelength, which is different from the usual laser wavelengths. Such different laser wavelengths can be generated by properly selecting the laser material, by so-called downstream Raman cells or OPOs (optical parametric oscillators) 30, or by other prior-art means. Provisions are also made for the laser gun operator to be able to select at least one other such wavelength.

Diode laser arrays of high output with wavelengths in the yellow and green will also become available with the progression of technical development. Such, continuously emitting lasers are also well-suited as sources for a dazzling laser.

A "rifle" with an aiming device, which may be a simple aiming telescope 12 or a night-vision device 14 (low light level amplifier or heat image device), is provided as the carrier of such a laser. The rifle and the aiming device as well as additional measuring instruments for target reconnaissance are connected to a control computer 20 and to a power supply unit, which is to be carried by the "gun operator" in arraying device.

To set the "correct" laser parameters, it is necessary to reconnoiter the target, i.e., to determine relevant target 18 and environmental parameters, which can be performed by measurement or estimate. Besides the most important target parameter, namely, the distance of the target subject, it is necessary to determine whether the target subject sees by the naked eye or through a telescope, which does affect the light intensity. Sunglasses, which influence the transmission of a laser radiation, may also have to be estimated.

The environmental parameters to be determined are the light conditions, which influence the adaptation of the eyes (dilation of the pupils), as well as the meteorological visibility and the turbulence of the atmosphere, on which the transmission and the fluctuations in the intensity of the laser radiation from the laser to the target subject depend. The existence of an undisturbed and free line of sight or the presence of leaves located in the line of sight, or even of a window pane, behind which the target person is standing, is to be estimated as well.

These parameters may be either estimated by the gun operator 16 by observation by the naked eye or through the aiming device 12, 14, or be measured by measuring devices 22, 24. The target distance can be determined by means of, e.g., a range finder 22, the visibility by contrast measurements as a function of the distance, and the light conditions by means of an exposure meter 24.

It is advantageous for the intraocular exposure to be reached, and the laser beam diameter at the target distance to be determined by the gun operator and be entered into the control computer 20. The intensity of dazzling of the eyes and the safety margin from the laser energy leading to an irreversible damage to the eyes can thus be selected in a situation-adapted manner. It can also be achieved, e.g., that the laser beam will dazzle only the eyes of one or more selected target subjects, while the subjects standing in their environment are not dazzled. It is also possible, especially in the case of short target distances, to guarantee that both eyes of the target subjects will be dazzled.

The above-mentioned target reconnaissance values are entered into the control computer, which may be, e.g., a Newton Notepad. This is preferably performed automatically if the target reconnaissance values were determined by means of measuring devices 22, 24, 12, 14, and by the gun operator 16, if the values are estimated values or the desired laser beam diameter. The control computer 20 then calculates from these values the laser parameters necessary for dazzling the eyes in the known manner and automatically presets and regulates them, i.e., the divergence of the beam by means of the transmitting optical system 32, the single pulse or the pulse train and the pulse energy 34 of the "laser shot" to be fired by the gun operator as needed.

The control computer 20 first calculates for this purpose the pupil dilation of the target subject, which can be expected from the measured light conditions, and it then determines the energy density to be reached at the target for a single laser pulse from the intraocular exposure to be reached and the desired laser beam diameter at the target 18. It optionally takes into account the values entered by the gun operator for the light-transmitting capacity of the telescope being used by the target subject or of the transmission of his sunglasses. Using the values for the target distance and the visibility, the control computer then calculates the transmission of the propagation path from the laser to the target subject and from this, the laser pulse energy to be emitted. If this is higher than the maximum individual pulse energy of the laser, the computer calculates the number of pulses necessary for the desired dazzling effect and their pulse energy, taking into account the known dependence of the damage threshold on the number of pulses in the process. If the pulse energy can be set in discrete steps only, e.g., by means of reducers, the control computer calculates a corresponding correction for the beam divergence for fine tuning. It also takes into account the fact that, corresponding to the value entered for the turbulence intensity in the propagation path of the laser beam, the necessary pulse energy must be reduced in order to maintain the desired safety margin of the laser energy from an irreversible damage to the eyes despite the turbulence-related, possible short-term increase in laser energy density at the target.

If a laser diode array is used as the source, the control computer analogously calculates the intraocular exposure to be reached for continuous lasers of this wavelength, as well as the other relevant parameters described, and it determines from these the laser power to be emitted and the irradiation time. It again takes into account the known dependence of the damage threshold on the wavelength, output, and the irradiation time.

The useful range of the above-described system depends, of course, on the accuracy of measurement or estimate of the target reconnaissance, besides on the laser parameters; it is approximately <1 km during the daytime and <5 km during nighttime under good visibility and measurement conditions.

While a specific embodiment of the invention has been shown and described in detail to illustrate the application of the principles of the invention, it will be understood that the invention may be embodied otherwise without departing from such principles.

FIG. 1

| KEY: | |
| --- | --- |
| OPO (Wellenlänge) = | OPO (wavelength) |
| Abschwächer (Pulsenergie) = | Reducer (pulse energy) |
| Sendeoptik (Divergenz) = | Transmission optics (divergence) |
| Steuerrechner = | Control computer |
| Ziel = | Target |
| Entfernungsmesser = | Range finder |
| Belichtungsmesser = | Exposure meter |
| Schütze = | Gun operator |
| Nachtsichtgerät = | Night-vision device |
| Zielfernrohr = | Aiming telescope |

I claim:

1. A weapons system, comprising:
   a dazzling laser with directed laser radiation operating in the visible range, which is integrated in a carrier;
   an aiming device connected to the carrier;
   a range finder;
   a portable power supply unit;
   measuring means for determining target reconnaissance parameters;
   adjustment means for adjusting the laser in terms of beam divergence, energy to be emitted, and irradiation time; and
   a control computer for receiving target reconnaissance parameters with respect to a target subject and the environment, the control computer calculating the laser parameters of beam divergence, number of pulses or single pulse, pulse energy necessary for the reversible dazzling of the eye on the basis of the target reconnaissance parameters and automatically presetting and regulating the resulting laser power and the exposure time of the continuous laser.

2. A weapons system in accordance with claim 1, wherein the laser is a flashlamp-pumped Nd:YAG solid-state pulsed laser operating in the visible range, which has a wavelength of 0.53 $\mu$m, a pulse length of 10 nanosec, a pulse energy of <~50 mJ in the single pulse or <~0.5 mJ in the pulse train at 1 kHz and a laser beam diameter of approximately 20 cm at the target distance.

3. A weapons system in accordance with claim 1, wherein the laser is a continuously emitting diode laser array.

4. A weapons system in accordance with claim 1, wherein said laser has a default operating wavelength, said system further comprising laser tuning means for tuning the laser to at least one other wavelength different from said default operating wavelength.

5. A weapons system in accordance with claim 1, further comprising at least one laser adjustment means for producing another laser wavelength.

6. A weapons system in accordance with claim 5, wherein said laser adjustment means includes one of:
   a laser material selected for wavelength properties;
   Raman cells disposed downstream of said laser; and
   optical parametric oscillators.

7. A weapons system in accordance with claim 1, wherein said target reconnaissance parameters entered into the control computer with respect to the target subject include distance to target.

8. A weapons system in accordance with claim 1, wherein said target reconnaissance parameters entered into the control computer with respect to the target subject include a light-transmitting capacity of a telescope used by the target subject a light-transmitting capacity of sunglasses used by the target subject, and wherein the target reconnaissance parameters entered into the control computer concerning the environment include at least one of a brightness of the target's environment, the meteorological visibility and the turbulence of the atmosphere, and the type and the extent of a disturbance in the line of sight due to obstacles.

9. A weapons system in accordance with claim 1, wherein said measuring means includes range finders and exposure meters.

10. A weapons system in accordance with claim 1, wherein said measuring means determines visibility by contrast measurements by means of an aiming device and range finder as a function of the distance from the gun operator.

11. A weapons system in accordance with claim 1, further comprising a computer input for estimated target reconnaissance parameters said estimated target reconnaissance parameters being provided by observation by the naked eye and through an aiming device, said estimated target reconnaissance parameters being entered into the control computer via said input, the target reconnaissance parameters determined with measuring instruments are automatically entered into the control computer, and the target reconnaissance parameters estimated by the gun operator are entered into the computer by the gun operator.

12. A weapons system in accordance with claim 1, a computer input for setting the desired laser beam diameter at the target distance, wherein said beam diameter is entered into the control computer by the gun operator.

13. A weapons system, comprising:

a dazzling laser with directed laser radiation operating in the visible range, which is integrated in a carrier, said laser being a flashlamp-pumped Nd:YAG solid-state pulsed laser, having a wavelength of 0.53 µm, a pulse length of 10 nanosec, a pulse energy of <~50 mJ in the single pulse or <~0.5 mJ in the pulse train at 1 kHz and a laser beam diameter of approximately 20 cm at the target distance;

an aiming device connected to said carrier;

a range finder;

a portable power supply unit;

measuring means for determining target reconnaissance parameters;

adjustment means for adjusting the laser in terms of beam divergence, energy to be emitted, and irradiation time; and a control computer for receiving target reconnaissance parameters with respect to a target subject and the environment, the control computer calculating the laser parameters of beam divergence, number of pulses or single pulse, pulse energy necessary for the reversible dazzling of the eye on the basis of the target reconnaissance parameters and automatically presetting and regulating the resulting laser power and the exposure time of the continuous laser.

14. A weapons system in accordance with claim 13, wherein the laser comprises a continuously emitting diode laser array.

15. A weapons system in accordance with claim 13, wherein said laser has a default operating wavelength, said system further comprising laser tuning means for tuning the laser to at least one other wavelength different from said default operating wavelength.

16. A weapons system in accordance with claim 13, further comprising at least one laser adjusting means for cooperating with said laser for producing another laser wavelength.

17. A weapons system in accordance with claim 16, wherein said adjustment means includes one of:

a laser material selected for wavelength properties;

Raman cells disposed downstream of said laser; and optical parametric oscillators.

18. A weapons system in accordance with claim 13, wherein said target reconnaissance parameters entered into the control computer with respect to the target subject include distance to target and a light-transmitting capacity of a telescope used by the target subject a light-transmitting capacity of sunglasses used by the target subject, and wherein the target reconnaissance parameters entered into the control computer concerning the environment include at least one of a brightness of the target's environment, the meteorological visibility and the turbulence of the atmosphere, and the type and the extent of a disturbance in the line of sight due to obstacles.

19. A weapons system in accordance with claim 13, further comprising a computer input for estimated target reconnaissance parameters said estimated target reconnaissance parameters being provided by observation by the naked eye and through an aiming device, said estimated target reconnaissance parameters being entered into the control computer via said input, the target reconnaissance parameters determined with measuring instruments are automatically entered into the control computer, and the target reconnaissance parameters estimated by the gun operator are entered into the computer by the gun operator.

* * * * *